US009032454B2

United States Patent
Raftelis et al.

(10) Patent No.: US 9,032,454 B2
(45) Date of Patent: May 12, 2015

(54) SYSTEM AND METHOD OF PROVIDING INTERACTIVE CONTENT

(75) Inventors: Michael Thomas Raftelis, San Antonio, TX (US); John McClenny, San Antonio, TX (US); John Hugh Kirby, Jr., San Antonio, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1728 days.

(21) Appl. No.: 11/541,918

(22) Filed: Oct. 2, 2006

(65) Prior Publication Data
US 2008/0092176 A1     Apr. 17, 2008

(51) Int. Cl.
| | | |
|---|---|---|
| H04N 7/173 | (2011.01) |
| H04N 21/44 | (2011.01) |
| H04N 21/442 | (2011.01) |
| H04N 21/454 | (2011.01) |
| H04N 21/472 | (2011.01) |
| H04N 21/4722 | (2011.01) |
| H04N 21/643 | (2011.01) |
| H04N 21/658 | (2011.01) |
| H04N 21/81 | (2011.01) |

(52) U.S. Cl.
CPC ..... *H04N 7/17318* (2013.01); *H04N 21/44008* (2013.01); *H04N 21/44209* (2013.01); *H04N 21/4542* (2013.01); *H04N 21/47202* (2013.01); *H04N 21/4722* (2013.01); *H04N 21/64322* (2013.01); *H04N 21/6581* (2013.01); *H04N 21/6582* (2013.01); *H04N 21/818* (2013.01)

(58) Field of Classification Search
None
See application file for complete search history.

(56) References Cited

U.S. PATENT DOCUMENTS

| | | | | |
|---|---|---|---|---|
| 2002/0162118 A1* | 10/2002 | Levy et al. | 725/110 |
| 2003/0028890 A1* | 2/2003 | Swart et al. | 725/91 |
| 2004/0103199 A1* | 5/2004 | Chao et al. | 709/228 |
| 2004/0148281 A1* | 7/2004 | Bates et al. | 707/3 |
| 2007/0250863 A1* | 10/2007 | Ferguson | 725/46 |
| 2008/0033918 A1* | 2/2008 | Wilson et al. | 707/3 |
| 2008/0037525 A1* | 2/2008 | Karaoguz et al. | 370/352 |
| 2008/0040226 A1* | 2/2008 | Roker | 705/14 |
| 2008/0065991 A1* | 3/2008 | Grimes et al. | 715/719 |
| 2009/0199230 A1* | 8/2009 | Kumar et al. | 725/32 |
| 2009/0320073 A1 | 12/2009 | Reisman | |

* cited by examiner

*Primary Examiner* — Nathan Flynn
*Assistant Examiner* — Omar S Parra
(74) *Attorney, Agent, or Firm* — Toler Law Group, PC

(57) ABSTRACT

In a particular embodiment, a method includes receiving a request for interactive content at a mediation device, the request sent from a set-top box device via a secure network. The method also includes receiving the interactive content at the mediation device from at least one content provider via an unsecured network. The method also includes removing at least one unapproved element from the interactive content. The method also includes sending the interactive content to the set-top box device via a video head-end.

16 Claims, 5 Drawing Sheets

SYSTEM AND METHOD OF PROVIDING INTERACTIVE CONTENT

FIELD OF THE DISCLOSURE

The present disclosure relates generally to providing interactive content.

BACKGROUND

Providing interactive content, such as Internet-based content, can present security risks for a network and associated devices. Nonetheless, service providers typically cannot suspend network functions to periodically update software at the network level or at the user level with security patches, for example. Firewalls add some security, but the interactive content received via a firewall is typically not combined with other types of content from other sources. Hence, there is a need for an improved system and method of providing interactive content.

DETAILED DESCRIPTION OF THE DRAWINGS

An interactive content mediation device is disclosed and includes a processor and a memory device accessible to the processor. In a particular embodiment, the memory device can include instructions executable by the processor to communicate with a set-top box device via a secure network to receive a request for interactive content. Further, the memory device can include instructions to request and receive the interactive content from at least one content provider via an unsecured network. In addition, the memory device can include instructions to send the interactive content to the set-top box device after removing at least one unapproved element from the interactive content.

In a particular embodiment, a method of providing interactive content is disclosed and includes receiving a request for interactive content at a mediation device, the request sent from a set-top box device via a secure network. The method also includes receiving the interactive content at the mediation device from at least one content provider via an unsecured network. The method also includes removing at least one unapproved element from the interactive content and sending the interactive content to the set-top box device via a video head-end.

In another particular embodiment, a method of receiving interactive content is disclosed and includes sending a request for interactive content from a set-top box device to a mediation device via a secure network, where the interactive content is provided by at least one content provider via an unsecured network. The method also includes receiving the interactive content from the mediation device via a video head-end after the mediation device has removed at least one unapproved element from the interactive content.

In another particular embodiment, a computer-readable medium is disclosed and includes instructions executable by a processor to communicate with a set-top box device via a secure network to receive a request for interactive content. The computer-readable medium also includes instructions to request and receive the interactive content from at least one content provider via an unsecured network. The computer-readable medium also includes instructions to determine whether the interactive content includes at least one unapproved element.

Figure 1:
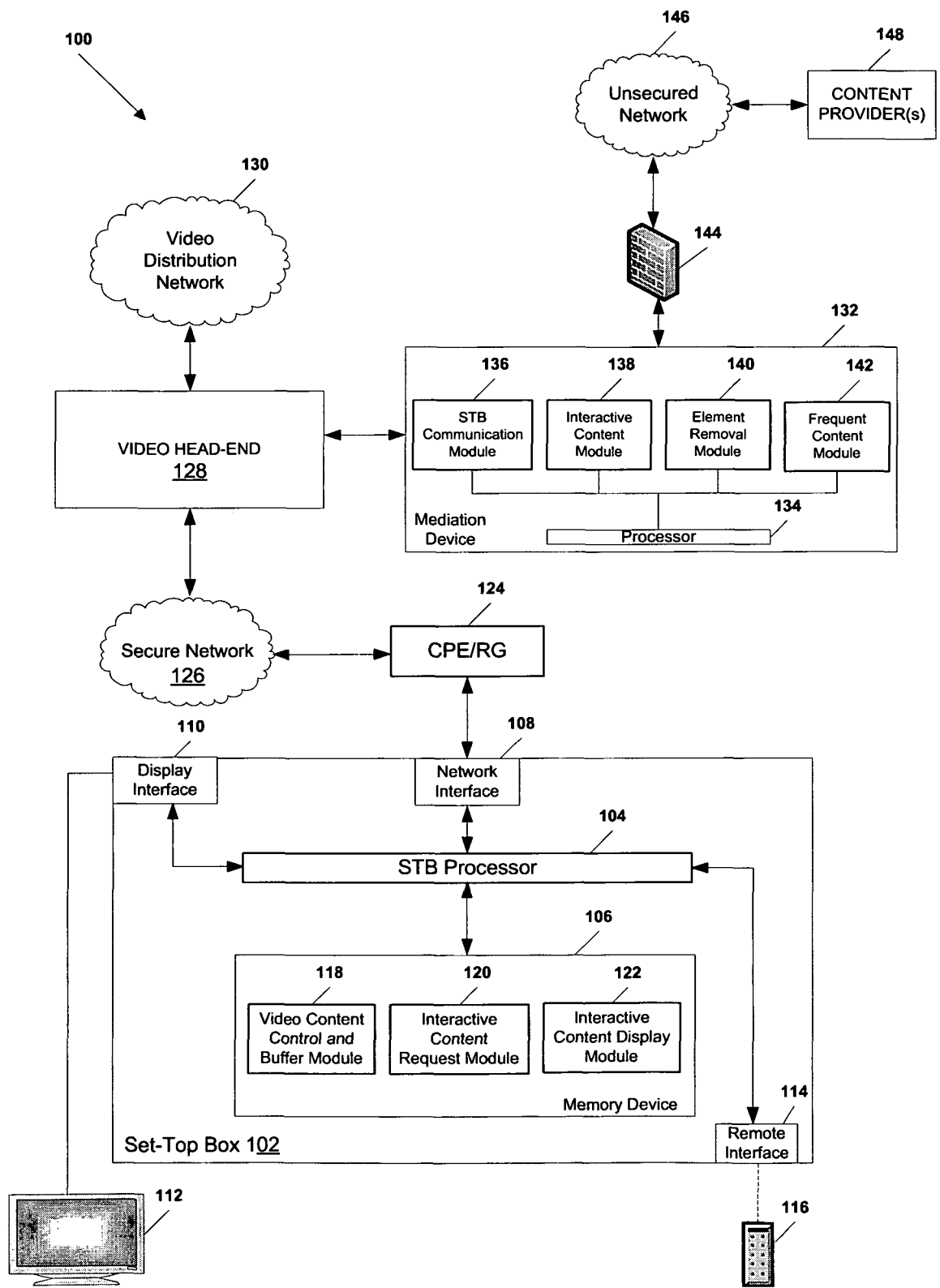
FIG. 1 is a block diagram of a particular illustrative embodiment of a system to provide interactive content.

Referring to FIG. 1, a particular illustrative embodiment of a system to provide interactive content is illustrated and designated generally at 100. The system 100 includes a set-top box device 102 that communicates with a video head-end 128, via a secure network 126. In an illustrative, non-limiting embodiment, the set-top box device 102 can be coupled to a customer premise equipment (CPE) device 124, such as a residential gateway (RG) device, digital subscriber line (xDSL) modem, other router or switch, or any combination thereof, that facilitates communication between the set-top box device 102 and the secure network 126. In a particular embodiment, the secure network 126 can be a private cable or Internet Protocol Television (IPTV) access network that serves a neighborhood, metropolitan area, state, nation, other geographic region, other market region, subscriber group, or any combination thereof.

As illustrated in FIG. 1, the video head-end 128 can communicate with a video distribution network 130 to receive video content from a super video head-end, for example. In an illustrative embodiment, the video head-end can communicate with an IPTV video distribution network, to receive video content, voice communication content, audio content, secure data content, or any combination thereof.

In a particular embodiment, the system 100 can include a mediation device 132 that communicates with an unsecured network 146 to request and receive interactive content from one or more content providers 148. In an illustrative embodiment, the mediation device 132 can include a perimeter device, edge device, other interface, or any combination thereof, coupled to the video head-end 128. In an exemplary embodiment, the mediation device 132 can communicate with the unsecured network 146 via a firewall 144. The unsecured network 146 can include, for instance, the Internet, an unsecured network accessible via the Internet, a network designated as unsecured by a user or administrator, or any combination thereof.

In a particular embodiment, the set-top box device 102 can include a processor 104 and a memory device 106 accessible to the processor 104. Further, the set-top box device 102 can communicate with the CPE device 124 via a network interface 108 coupled to the processor 104. In addition, the set-top box device 102 can communicate with a display device 112 via a display interface 110 coupled to the processor 104. Moreover, the set-top box device 102 can communicate with a remote control device 116 via a remote interface 114 coupled to the processor 104.

In a particular embodiment, the memory device 106 can include a video content control and buffer module 118 that is executable by the processor 104 to send requests for video content to the video head-end 128, for example, in response to a channel selection. In addition, the video content control and buffer module 118 can be executable by the processor 104 to receive video content via the video head-end 128, for instance, from an IPTV system communicating with the video head-end 128 via the video distribution network 130. In an illustrative embodiment, the video content control and buffer module 118 can be executable by the processor 104 to receive data packets carrying the video content and to buffer the data packets to prevent underflow to the display device 112.

In a particular embodiment, the memory device 106 can include an interactive content request module 120 that is executable by the processor 104 to communicate with the mediation device 132 via the secure network 126. The interactive content request module 120 can be executable by the processor 104 to send a request for interactive content, such as Internet-based content, to the mediation device 132. For example, the set-top box device 102 can receive a command to display the interactive content via the remote control device 116 and send a request for the interactive content to the mediation device 132 over the secure network 126 via the video head-end 128.

In a particular embodiment, the memory device 106 can include an interactive content display module 122 that is executable by the processor 104 to receive interactive content via the secure network 126 and to send the interactive content to the display device 112. In an illustrative, non-limiting embodiment, the interactive content display module 122 can be executable by the processor 104 to send the interactive content to the video content control and buffer module 118 to be displayed in conjunction with video content, for example, as an L-bar or otherwise overlaying or bordering the video content.

In an illustrative embodiment, one or more of the various modules 118-122 can include hardware logic, software logic, or any combination thereof, adapted to provide various functions of the set-top box device 102. For example, one or more of the modules 118-122 can include computer instructions that are executable by the processor 104, where the instructions are stored as one or more computer programs at the memory device 106.

In a particular embodiment, the mediation device 132 can include a processor 134. Further, the mediation device 132 can include a set-top box communication module 136 that is executable by the processor 134 to receive a request for interactive content from the set-top box device 102 via the secure network 126. In addition, the set-top box communication module 136 can be executable by the processor 134 to send interactive content received from one or more content providers, such as the content provider(s) 148, to the set-top box device 102.

In a particular embodiment, the mediation device 132 can include an interactive content module 138 that is executable by the processor 134 to retrieve interactive content from the content provider(s) 148 via the unsecured network 146 in response to a request from the set-top box device 102. Further, the mediation device 132 can include an element removal module 140 that is executable by the processor 134 to determine whether interactive content retrieved via the unsecured network 146 includes one or more unapproved elements and to remove any unapproved element(s) from the interactive content before sending the interactive content to the set-top box device 102. Unapproved elements can include, for example, a particular protocol; a particular type of code, such as Java code; a script; a particular type of session; a particular type of content stream; a virus; a worm; a data error; unauthorized content, such as a particular type of content (e.g., adult content or violent content), content from a particular source (e.g., a particular website), or content that requires a bandwidth that exceeds a threshold; or any combination thereof.

In a particular embodiment, the mediation device 132 can include a frequent content module 142 that is executable by the processor 134 to receive data from the set-top box device 102 indicating that particular interactive content is frequently used content, favorite content, or any combination thereof. Further, the frequent content module 142 can be executable by the processor 134 to store the particular interactive content, or send the particular interactive content to a data store for storage, after any unapproved element(s) have been removed. In addition, the frequent content module 142 can be executable by the processor 134 to determine whether interactive content requested by the set-top box device 102 is stored at the mediation device 132, or at a data store communicating with the mediation device 132. If the requested interactive content is stored at the mediation device 132, or at a data store communicating with the mediation device 132, the frequent content module 142 can be executable by the processor 134 to retrieve the requested interactive content and send the interactive content to the set-top box device 102 without communicating with the content provider(s) 148. In another embodiment, the frequent content module 142 can be executable by the processor 134 to retrieve the requested interactive content and send the interactive content to the set-top box device 102 after communicating with the content provider(s) to check for updates.

In an illustrative embodiment, one or more of the various modules 136-142 can include hardware logic, software logic, or any combination thereof, adapted to provide various functions of the mediation device 132. For example, one or more of the modules 136-142 can include computer instructions that are executable by the processor 134, where the instructions are stored as one or more computer programs at a memory of the mediation device 132.

In a particular illustrative embodiment, a user can issue a command to the set-top box device 102 to display interactive content at the display device 112. For example, a user can select a programmable smart key or other key on the remote control device 116, use the remote control device 116 to select a graphical menu item, or any combination thereof, to display interactive content from an e-commerce website, a dating website, or other website, at the display device 112. The set-top box device 102 can receive the command and send a request for the interactive content to the mediation device 132 via the secure network 126. In one embodiment, the set-top box device 102 can send the request to the video head-end 128, and the video head-end 128 can communicate the request to the mediation device 132.

In an illustrative, non-limiting embodiment, the mediation device 132 can determine whether the interactive content is stored at the mediation device 132, or at a data store communicating with the mediation device 132. For example, the mediation device 132 can determine whether the interactive content is frequently used content associated with the set-top box device 102. In an illustrative embodiment, the interactive content can be selected from a favorites menu displayed at the display device 112, and the set-top box device 102 can indicate such selection with its request for the interactive content.

If the requested interactive content is stored at the mediation device 132 or at a data store communicating with the mediation device 132, the mediation device 132 can retrieve the requested interactive content from storage and send it to the set-top box device 102 via the secure network 126. On the other hand, if the requested interactive content is not stored at the mediation device 132, or at a data store communicating with the mediation device 132, the mediation device 132 can request the interactive content from one or more of the content provider(s) 148 via the unsecured network 146.

In a particular embodiment, the mediation device 132 can receive the requested interactive content from one or more of the content provider(s) 148 via the unsecured network 146. The mediation device 132 can determine whether the interactive content includes one or more unapproved elements. If the interactive content includes any unapproved element(s), the mediation device 132 removes the unapproved element(s) and sends the interactive content to the set-top box device 102 via the secure network 126. In an illustrative embodiment, the mediation device 132 can send the interactive content to the video head-end 128, and the video head-end 128 can send the interactive content to the set-top box device 102. The video head-end 128 can also send video content, other content, or any combination thereof, received at the video head-end 128 via the IPTV video distribution network 130, to the set-top box device 102. In an illustrative, non-limiting embodiment, the video head-end 128 can merge the interactive content with video content, e.g., into single stream.

In an illustrative embodiment, the set-top box device 102 can receive the interactive content and send it to the display device 112 for display in conjunction with, or without, video content. Further, a user can issue a command to the set-top box device 102, by selecting a menu option or other indicator, to designate the interactive content as frequently used content, favorite content, or any combination thereof. The set-top box device 102 can send data indicating the selection to the mediation device 132, and the mediation device 132 can associate the interactive content with the set-top box device 102 and store the interactive content locally or at a data store communicating with the mediation device 132.

Figure 2:
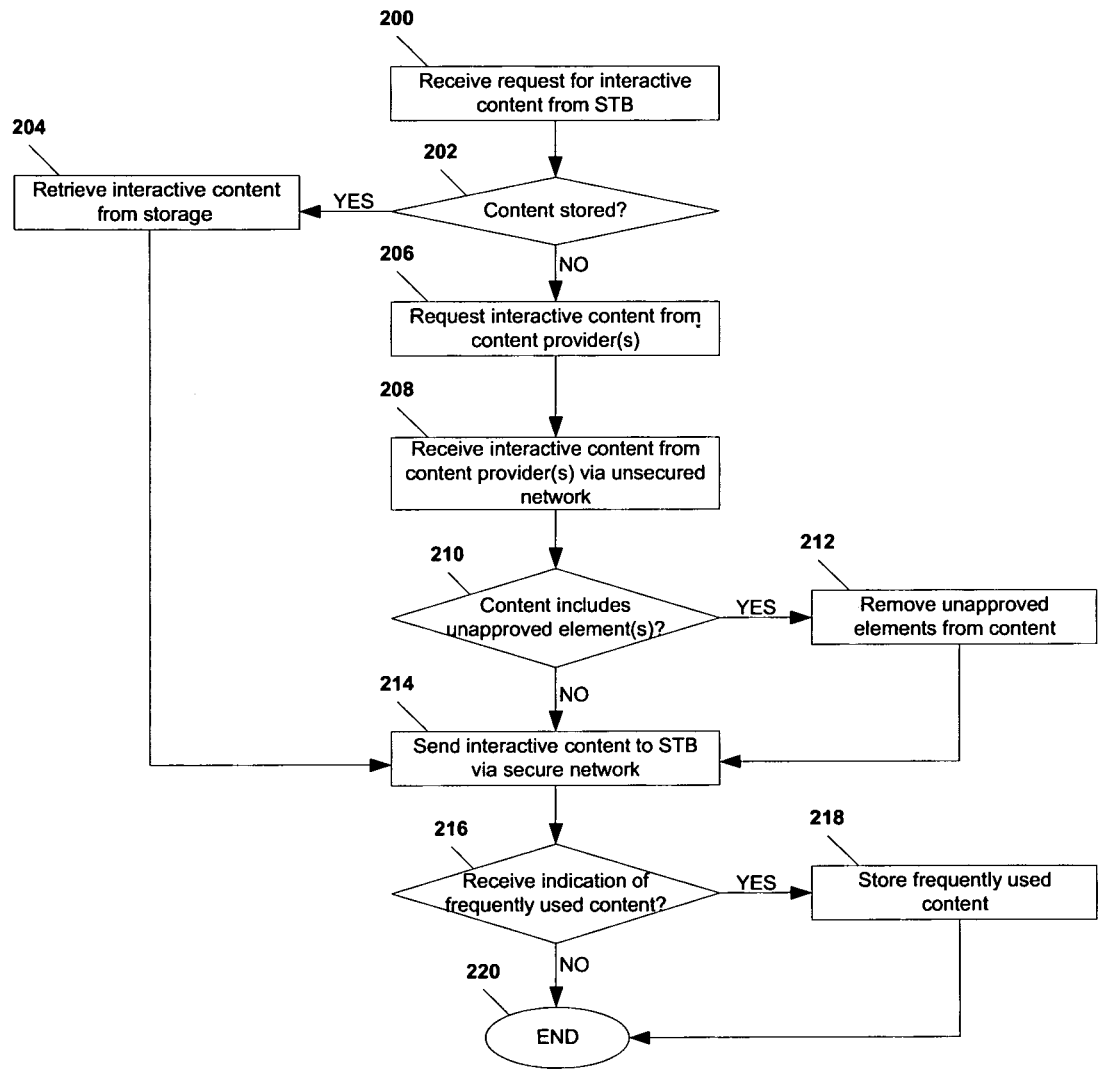
FIG. 2 is a flow diagram of a particular illustrative embodiment of a method of providing interactive content.

Referring to FIG. 2, a particular illustrative embodiment of a method of providing interactive content is illustrated. At block 200, a mediation device can receive a request for interactive content from a set-top box device. In an illustrative embodiment, the mediation device can receive the request from the set-top box device over a secure network via a video head-end.

Moving to decision node 202, in an illustrative, non-limiting embodiment, the mediation device can determine whether the requested interactive content is stored at the mediation device, a data store communicating with the mediation device, the video head-end, or any combination thereof. If the mediation device determines that the requested interactive content is stored, the method proceeds to block 204, and the mediation device retrieves the requested interactive content from storage. The method advances to block 214.

Returning to decision step 202, if the mediation device determines that the requested interactive content is not stored, the method proceeds to block 206, and the mediation device requests the interactive content from one or more content providers via an unsecured network, such as the Internet. Continuing to block 208, the mediation device receives the interactive content from the content provider(s) via the unsecured network.

Proceeding to decision node 210, the mediation device determines whether the interactive content received from the content provider(s) includes one or more unapproved elements. For instance, the mediation device can examine the interactive content to determine whether it includes one or more elements included in a group of unapproved elements defined at the mediation device. If the interactive content includes no unapproved element(s), the method moves to block 214. Whereas, if the interactive content includes one or more unapproved elements, the method advances to block 212, and the mediation device filters or otherwise removes the unapproved elements from the interactive content. For example, the mediation device can remove one or more codes, scripts, corrupt data, unauthorized content, other unapproved elements, or any combination thereof, from the interactive content. The method proceeds to block 214.

At block 214, in an illustrative embodiment, the mediation device sends the interactive content to the set-top box device via the secure network after any unapproved element(s) are removed. In an illustrative embodiment, the mediation device can send the interactive content to the video head-end, and the video head-end can send the interactive content to the set-top box device. In a particular embodiment, the video head-end can send the interactive content and video content received from an IPTV system to the set-top box device.

Continuing to decision node 216, the mediation device can determine whether it receives data indicating that the interactive content is frequently used content, favorite content, or any combination thereof. For example, the mediation device can receive data from the set-top box device indicating that the interactive content is frequently used content, favorite content, has been added to a favorites list or similar list at the set-top box device, or any combination thereof. If the mediation device determines that it has received such data, the method proceeds to block 218, and the mediation device can store the interactive content locally, at a data store communicating with the mediation device, at the video head-end, or any combination thereof. In an alternative embodiment, the interactive content can be stored at a memory device of the set-top box device. The method terminates at 220.

Figure 3:
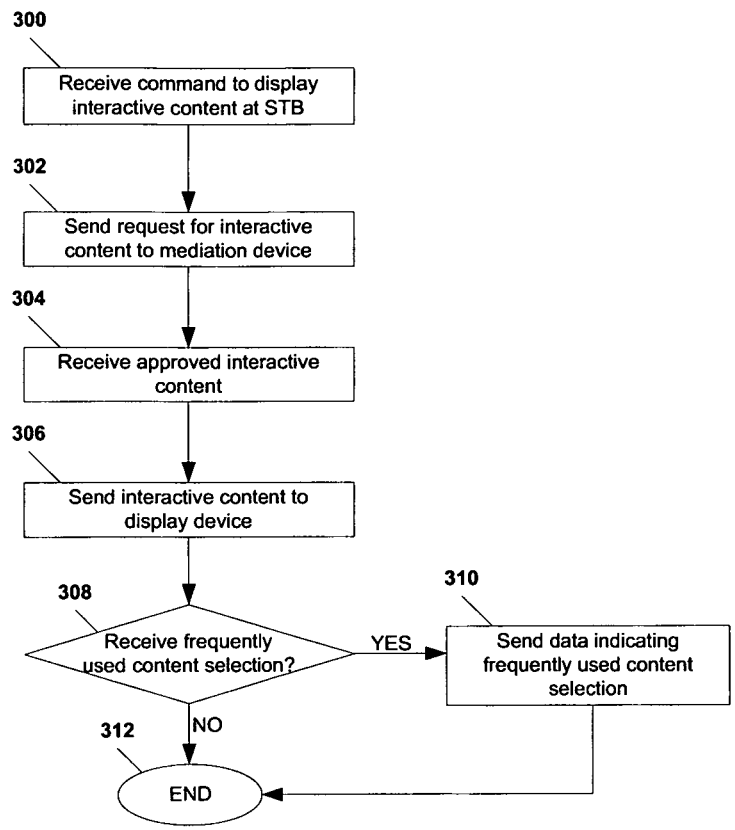
FIG. 3 is a flow diagram of a second particular illustrative embodiment of a method of providing interactive content.

Referring to FIG. 3, a second particular illustrative embodiment of a method of providing interactive content is illustrated. At block 300, a set-top box device receives a command to display interactive content. For example, the set-top box device can receive such a command via a remote control device communicating with the set-top box device. Moving to block 302, the set-top box device sends a request for the interactive content to a mediation device via a secure network.

Proceeding to block 304, the set-top box device receives the requested interactive content with any unapproved element(s) removed by the mediation device. Continuing to block 306, the set-top box device sends the interactive content to a display device coupled to the set-top box device. In a particular embodiment, the interactive content can be displayed at the display device overlaying video content, bordering video content, in a split-screen with video content, otherwise in conjunction with video content, or any combination thereof. Alternatively, the interactive content can be displayed without video content at the display device.

Proceeding to decision node 308, the set-top box device can determine whether it receives a selection indicating that the interactive content should be designated as frequently used content, favorite content, or any combination thereof. For example, a user can issue a command to the set-top box device indicating that the interactive content should be added to a favorites list or similar list at the set-top box device, at the mediation device, at the video head-end, or any combination thereof. If the set-top box device determines that it has received such a selection, the method moves to block 310, and the set-top box device can send data to the mediation device, video head-end, or any combination thereof, indicating that the interactive content should be stored at the mediation device, at a data store communicating with the mediation device, at the video head-end, or any combination thereof. In an alternative embodiment, the interactive content can be stored at a memory device of the set-top box device. The method terminates at 312.

Figure 4:
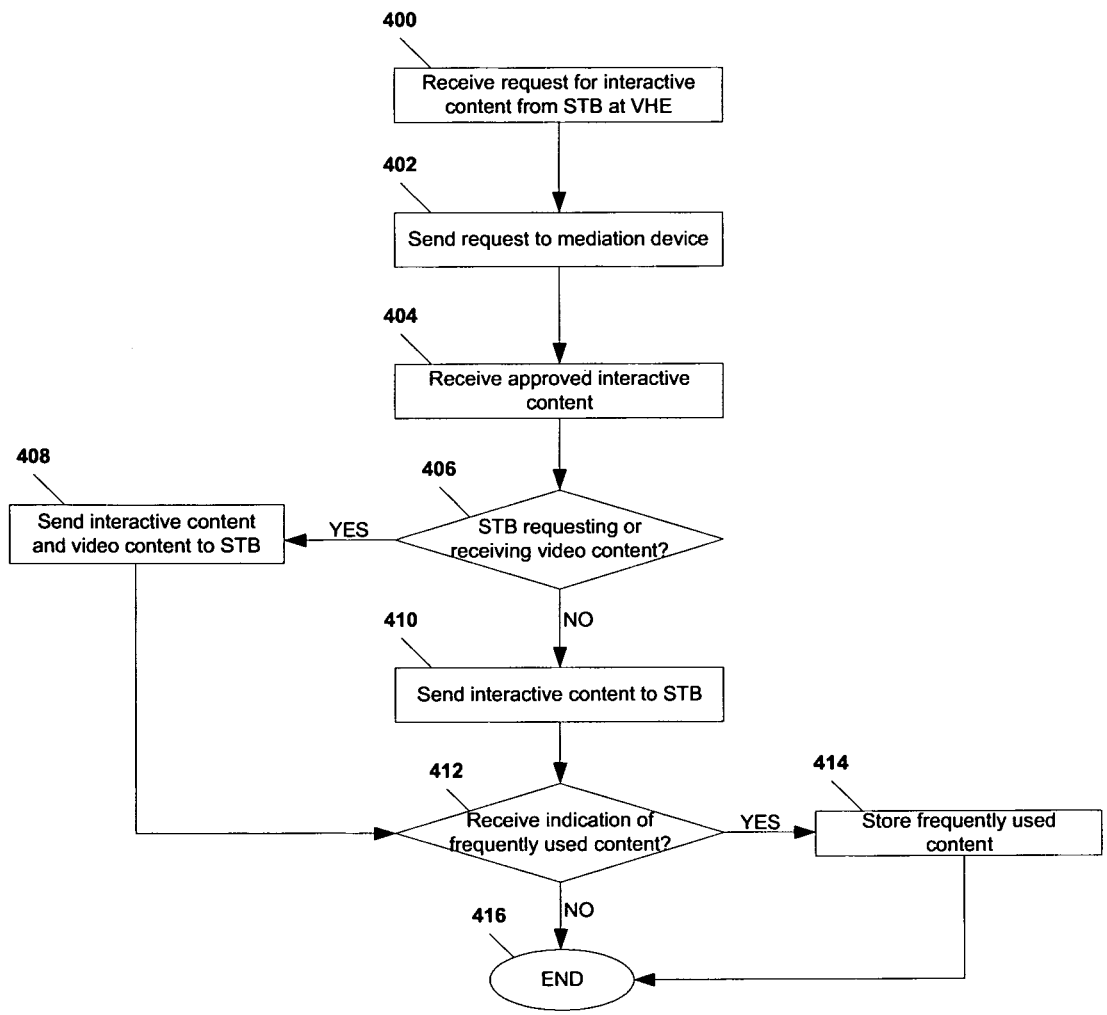
FIG. 4 is a flow diagram of a third particular illustrative embodiment of a method of providing interactive content.

Referring to FIG. 4, a third particular illustrative embodiment of a method of providing interactive content is illustrated. At block 400, a video head-end (VHE) can receive a request for interactive content from a set-top box device. In an illustrative embodiment, the VHE can receive the request from the set-top box device over a secure network. The VHE can include, for instance, one or more facilities, devices, or any combination thereof, from which video, voice communications, data, or any combination thereof, can be sent to a user via a secure network.

Moving to block 402, the VHE sends the request to a mediation device. Continuing to block 404, in a particular embodiment, the VHE receives the interactive content from the mediation device with any unapproved element(s) removed by the mediation device. In an illustrative embodiment, the mediation device can request the interactive content from one or more content providers via an unsecured network, such as the Internet, and remove any unapproved element(s) of the interactive content.

Proceeding to decision node 406, in a particular embodiment, the VHE can determine whether the set-top box device is receiving, or has requested, video content from an IPTV system via the VHE. If the set-top box device is receiving, or has requested, video content, the method advances to block 408, and the VHE sends the video content and the interactive content to the set-top box device. The method then advances to decision node 412. In an illustrative embodiment, the VHE can merge the interactive content and video content into a single stream of data packets, for example. In another embodiment, the VHE can send the video content and interactive content to the set-top box device as separate streams, signals, or any combination thereof.

Returning to decision node 406, if the set-top box device is not receiving, and has not requested, video content, the method moves to block 410, and the VHE sends the interactive content to the set-top box device. Continuing to decision node 412, the VHE can determine whether it receives data indicating that the interactive content is frequently used content, favorite content, or any combination thereof. If the VHE determines that it has received such data, the method proceeds to block 414, and the VHE can store the interactive content locally, at a data store communicating with the VHE, at the mediation device, at a data store communicating with the mediation device, or any combination thereof. In an alternative embodiment, the interactive content can be stored at a memory device of the set-top box device. The method terminates at 416.

In a particular embodiment, the steps of the methods described herein can be executed in the order shown by the figures. In alternative embodiments, some steps can be executed simultaneously or in alternative sequences.

In conjunction with the configuration of structure described herein, the system and method disclosed provides interactive content to a set-top box device, with or without video content, after removing harmful or otherwise unapproved elements of the interactive content. In a particular illustrative embodiment, a user can issue a command to a set-top box device to display interactive content at a display device. The set-top box device can send a request for the interactive content to a mediation device via a secure network.

The mediation device can request and receive the interactive content from one or more content provider(s) via an unsecured network. The mediation device can determine whether the interactive content includes one or more unapproved elements. If the interactive content includes any unapproved element(s), the mediation device removes the unapproved element(s) and sends the interactive content to the set-top box device via the secure network. In an illustrative embodiment, the set-top box device can receive the interactive content and send it to the display device for display in conjunction with, or without, video content.

Figure 5:
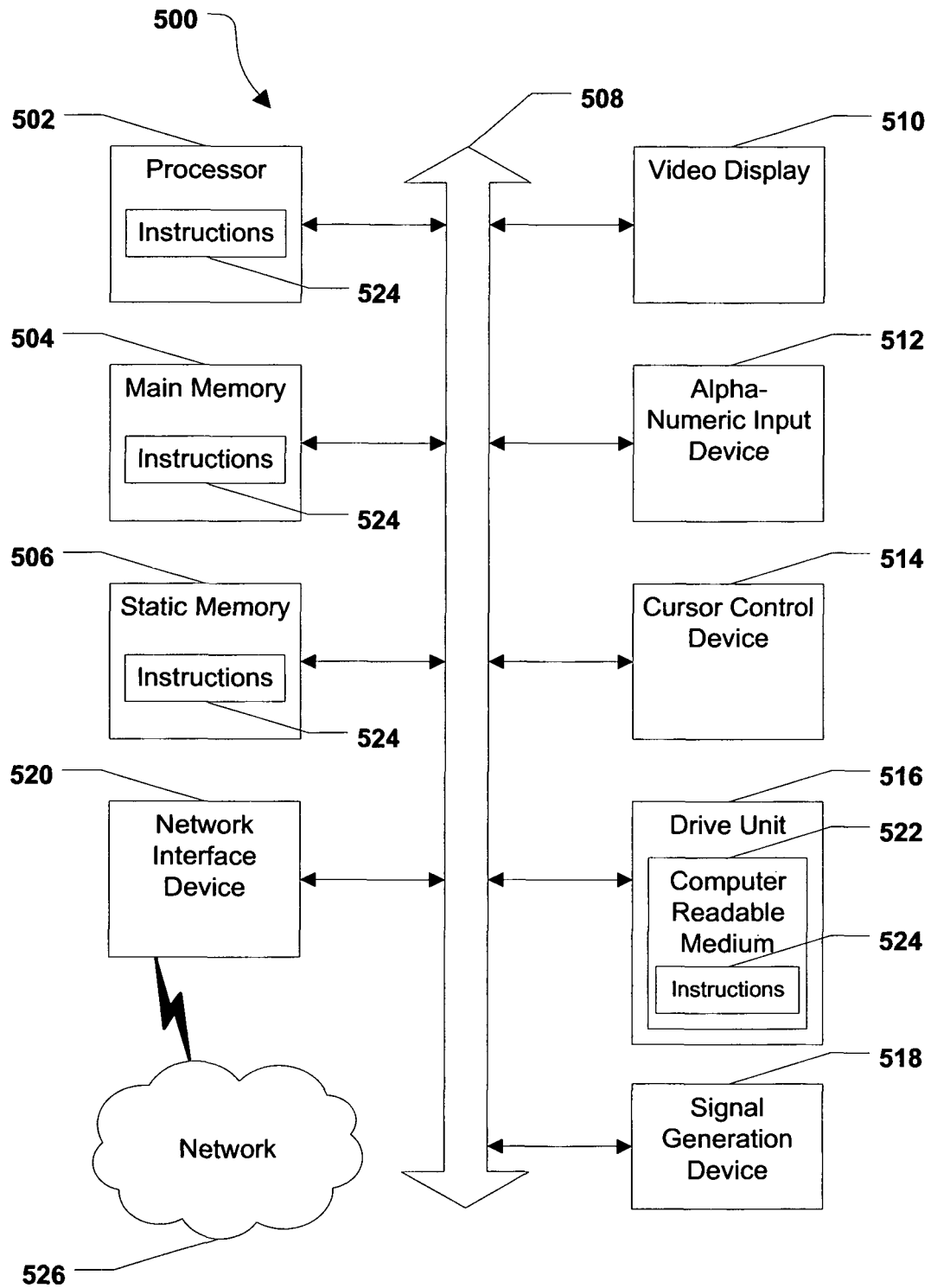
FIG. 5 is a diagram of an illustrative embodiment of a general computer system.

Referring to FIG. 5, an illustrative embodiment of a general computer system is shown and is designated 500. The computer system 500 can include a set of instructions that can be executed to cause the computer system 500 to perform any one or more of the methods or computer based functions disclosed herein. The computer system 500, or any portion thereof, may operate as a standalone device or may be connected, e.g., using a network, to other computer systems or peripheral devices, including a server or other system at a video head-end, a set-top box device, a mediation device, or any combination thereof, as shown in FIG. 1.

In a networked deployment, the computer system may operate in the capacity of a server or other system at a video head-end, a set-top box device, or a mediation device. The computer system 500 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 500 can be implemented using electronic devices that provide voice, video or data communication. Further, while a single computer system 500 is illustrated, the term "system" shall also be taken to include any collection of systems or sub-systems that individually or jointly execute a set, or multiple sets, of instructions to perform one or more computer functions.

As illustrated in FIG. 5, the computer system 500 may include a processor 502, e.g., a central processing unit (CPU), a graphics-processing unit (GPU), or both. Moreover, the computer system 500 can include a main memory 504 and a static memory 506 that can communicate with each other via a bus 508. As shown, the computer system 500 may further include a video display unit 510, such as a liquid crystal display (LCD), an organic light emitting diode (OLED), a flat panel display, a solid state display, or a cathode ray tube (CRT). Additionally, the computer system 500 may include an input device 512, such as a keyboard, and a cursor control device 514, such as a mouse. The computer system 500 can also include a disk drive unit 516, a signal generation device 518, such as a speaker or remote control, and a network interface device 520.

In a particular embodiment, as depicted in FIG. 5, the disk drive unit 516 may include a computer-readable medium 522 in which one or more sets of instructions 524, e.g. software, can be embedded. Further, the instructions 524 may embody one or more of the methods or logic as described herein. In a particular embodiment, the instructions 524 may reside completely, or at least partially, within the main memory 504, the static memory 506, and/or within the processor 502 during execution by the computer system 500. The main memory 504 and the processor 502 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 524 or receives and executes instructions 524 responsive to a propagated signal, so that a device connected to a network 526 can communicate voice, video or data over the network 526. Further, the instructions 524 may be transmitted or received over the network 526 via the network interface device 520.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In accordance with various embodiments, the methods described herein may be implemented as one or more software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that software that implements the disclosed methods may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories. The software may also utilize a signal containing computer instructions. A digital file attachment to e-mail or other self-contained information archive or set of archives is considered a distribution medium equivalent to a tangible storage medium. Accordingly, the disclosure is considered to include a tangible storage medium or distribution medium as listed herein, and other equivalents and successor media, in which the software implementations herein may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of providing interactive content, the method comprising:
   receiving a request for an interactive content stream at a mediation device, the request sent from a media device via a secure network;
   receiving the interactive content stream at the mediation device from a content provider via an unsecured network, wherein the interactive content stream includes a first interactive content element and a second interactive content element;
   determining, at the mediation device, whether the first interactive content element is to be delivered at a bandwidth that exceeds a threshold; and
   when the first interactive content element is to be delivered at the bandwidth that exceeds the threshold, removing the first interactive content element from the interactive content stream at the mediation device to produce a filtered interactive content stream to be sent to the media device via a video head-end, wherein the filtered interactive content stream includes the second interactive content element.

2. The method of claim 1, wherein the secure network includes a private television access network, wherein video content received at the video head-end via a private television video distribution network is merged with the filtered interactive content stream into a single stream of data packets at the video head-end, and wherein the single stream of data packets is sent from the video head-end to the media device via the private television access network.

3. The method of claim 2, wherein the video head-end receives the video content from a super video head-end.

4. The method of claim 2, wherein the filtered interactive content stream is displayed at a display device associated with the media device in conjunction with the video content.

5. The method of claim 1, wherein the unsecured network is designated as unsecured by a user associated with the media device, by an administrator, or any combination thereof.

6. The method of claim 1, wherein the mediation device includes a perimeter device, an edge device, or any combination thereof, coupled to the video head-end.

7. The method of claim 1, further comprising:
   determining, at the mediation device, whether the interactive content stream is associated with a particular category, wherein the particular category includes a particular protocol, a particular type of session, a data error, or any combination thereof; and
   when the interactive content stream is not to be transmitted to the media device at the bandwidth that exceeds the threshold and is not associated with the particular category, sending the interactive content stream to the media device via the video head-end.

8. An interactive content mediation device, comprising:
   a processor; and
   a memory device accessible to the processor, wherein the memory device includes instructions executable by the processor to perform operations including:
      communicating with a media device via a private television access network to receive a request for an interactive content stream;
      requesting and receiving the interactive content stream from a content provider via an unsecured network, wherein the interactive content stream includes a first interactive content element and a second interactive content element;
      determining whether the first interactive content element is to be delivered at a bandwidth that exceeds a threshold; and
      when the first interactive content element is to be delivered at the bandwidth that exceeds the threshold, removing the first interactive content element from the interactive content stream to produce a filtered interactive content stream to be sent to the media device via the private television access network, wherein the filtered interactive content stream includes the second interactive content element.

9. The device of claim 8, wherein the interactive content stream is an Internet-based content stream and wherein the unsecured network is the Internet or a network accessible via the Internet.

10. The device of claim 8, wherein the request is received via a residential gateway device coupled to the media device.

11. The device of claim 8, further comprising an interface coupled to a video head-end of a television system, and wherein the filtered interactive content stream is sent from the video head-end of the television system to the media device via the private television access network.

12. The device of claim 8, wherein the interactive content stream is received from the content provider via a firewall.

13. The device of claim 8, wherein the operations further include storing data of the filtered interactive content stream at the memory device.

14. The device of claim 13, wherein the operations further include:
   communicating with the media device via the private television access network to receive a second request for the interactive content stream;
   retrieving the data of the filtered interactive content stream stored at the memory device in response to the second request without accessing the unsecured network; and
   sending the filtered interactive content stream to the media device via the private television access network in response to the second request.

15. A computer-readable storage device storing instructions that are executable by a processor to perform operations comprising:
   communicating with a media device via a private television access network to receive a first request for an interactive content stream;
   in response to the first request, requesting and receiving the interactive content stream from a content provider via an unsecured network, wherein the interactive content stream includes a first interactive content element and a second interactive content element;
   determining whether the first interactive content element is to be delivered at a bandwidth that exceeds a threshold;
   when the first interactive content element is to be delivered at the bandwidth that exceeds the threshold, removing the first interactive content element from the interactive content stream to produce a filtered interactive content stream to be sent to the media device via the private television access network, wherein the filtered interactive content stream includes the second interactive content element;
storing data of the filtered interactive content stream at a data store;
communicating with the media device via the private television access network to receive a second request for the interactive content stream; and
in response to the second request:
retrieving the stored data of the filtered interactive content stream from the data store without accessing the unsecured network; and
sending the filtered interactive content stream to the media device via the private television access network.

16. The computer-readable storage device of claim 15, wherein the filtered interactive content stream is stored at an interactive content mediation device.

\* \* \* \* \*